D. W. ANDERSON.
MACHINE FOR MAKING FELT PADS.
APPLICATION FILED AUG. 22, 1914.
1,177,293.
Patented Mar. 28, 1916.
2 SHEETS—SHEET 1.
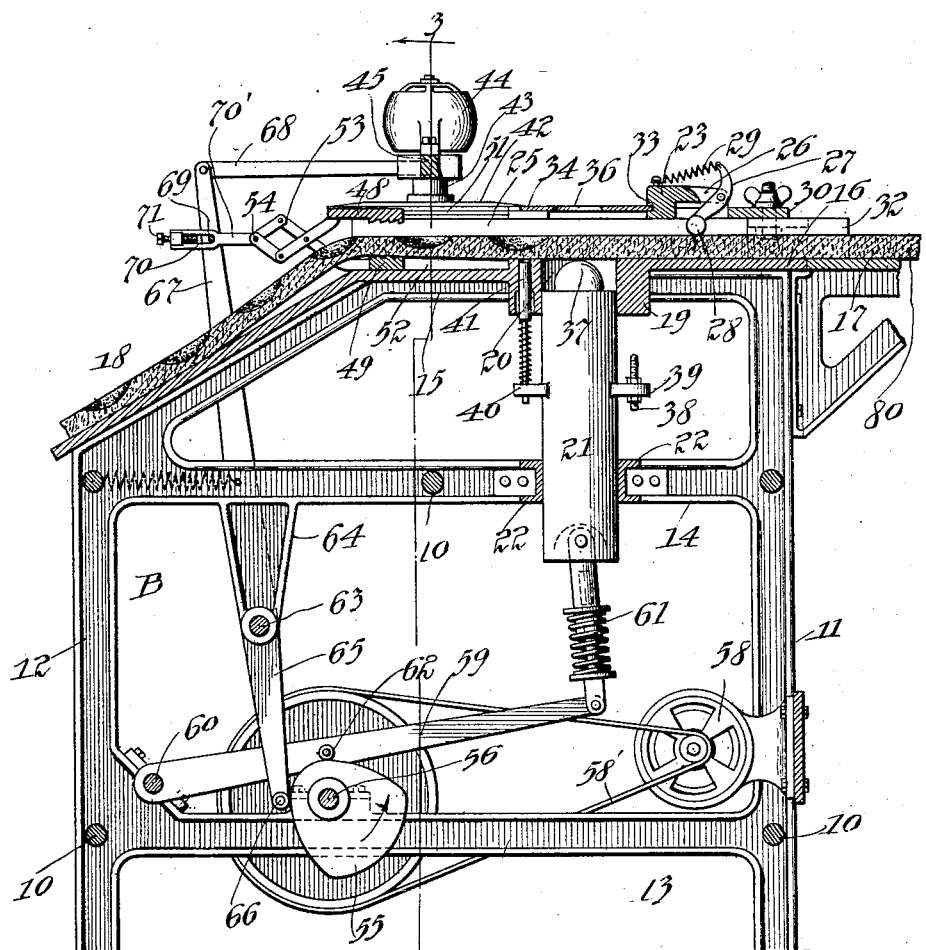
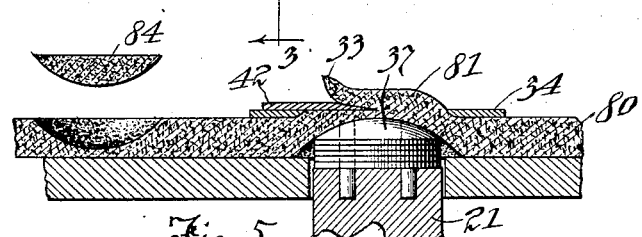

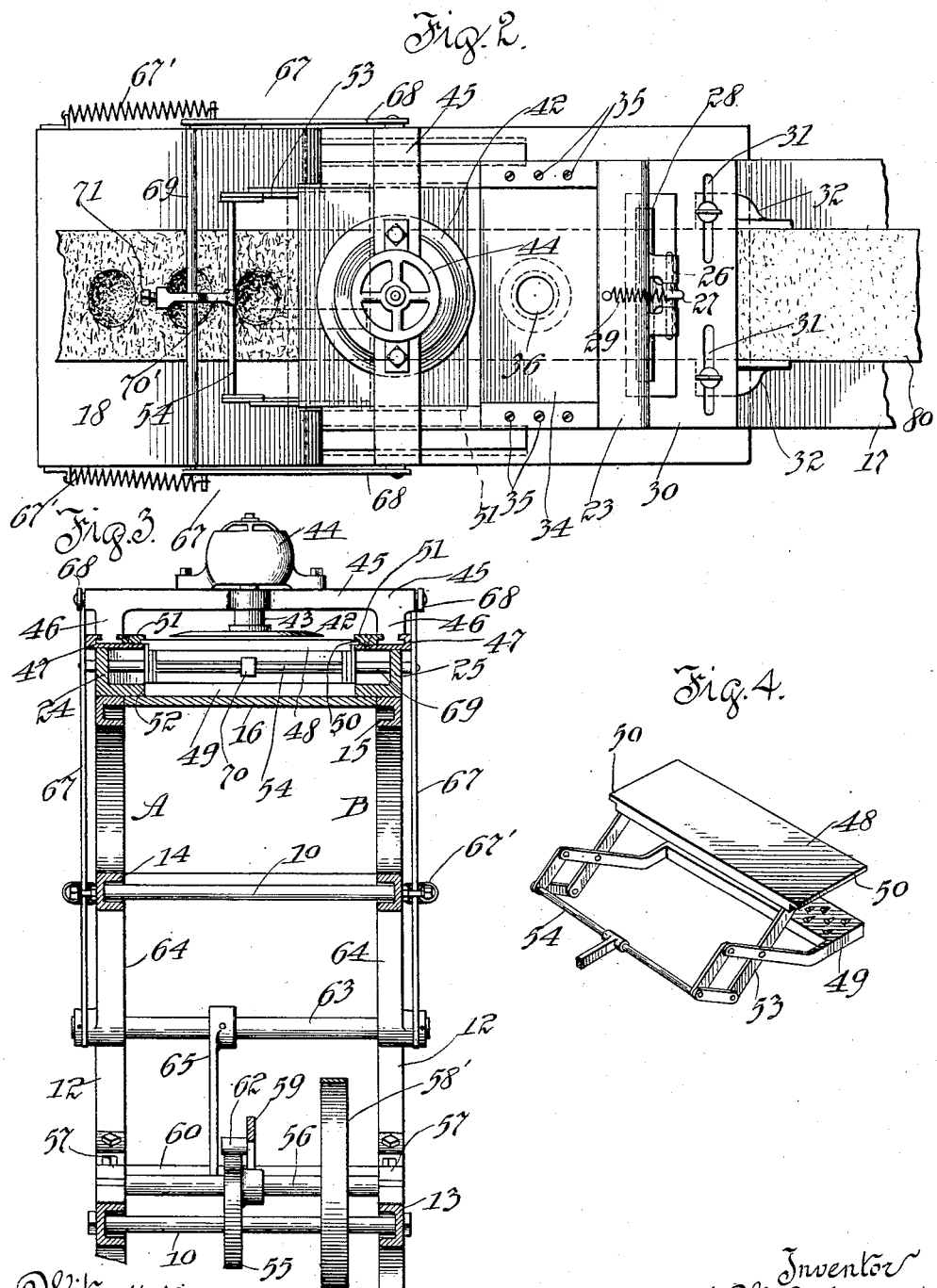

UNITED STATES PATENT OFFICE.

DAVID W. ANDERSON, OF LA FAYETTE, INDIANA.

MACHINE FOR MAKING FELT PADS.

1,177,293.  Specification of Letters Patent.  Patented Mar. 28, 1916.

Application filed August 22, 1914. Serial No. 858,079.

*To all whom it may concern:*

Be it known that I, DAVID W. ANDERSON, a citizen of the United States, residing at La Fayette, in the county of Tippecanoe and State of Indiana, have invented certain new and useful Improvements in Machines for Making Felt Pads, of which the following is a specification.

My invention relates to a machine for making convexed or concaved bodies of felt or other flexible, somewhat resilient substances; and more particularly to a machine for making such articles as felt bunion- and corn-shields, shoe-fillers and kindred pads, which are made of definite shape and generally of varying thickness, tapering toward their edges.

In my copending application Serial No. 815,911 filed February 2nd, 1914 and entitled "Method of making convexed or concaved bodies of felt or other flexible substances" I have illustrated and described a method whereby such articles may readily be formed from a flat strip of felt or similar material.

One of the objects of my present invention is to provide a machine for automatically manufacturing pads by the method described in my above referred to application.

In carrying out my method of making convexed or concaved bodies of felt or like material, two principal operations are involved; first, the formation of a node in the material and; second, the scalping or cutting off of the node. In performing these operations by an automatic machine, a third operation, namely, the feeding of the goods is necessary, and my machine may therefore be said to provide mechanism for performing three operations; first—the forming of a node or bend in the material from which the pad is to be formed; second—the scalping or cutting off of the node; and third—the feeding forward of the material to present a fresh piece of goods to the bend forming mechanism. My machine provides a simple and efficient mechanism for automatically producing such pads rapidly, easily and with great uniformity without requiring any attention from an operator other than the starting of the stock or strip of material into the feeding mechanism.

Whereas, in the following specification and claims I refer particularly to felt as the preferred material from which the above described pads are formed, it will be understood that any other material of flexible, somewhat resilient nature having fibrous toughness, elasticity, and lack of "grain" may be used to advantage in my machine. And, whereas I have illustrated and described a particular embodiment of my invention adapted for forming bunion or corn shields, shoe fillings and the like it is obvious that, changes may be made in the mechanism, or the machine may be used for forming shaped bodies for other purposes, and still be within the spirit and scope of my invention.

In the accompanying drawing wherein I have illustrated a practical and simple machine embodying my invention; Figure 1 is a longitudinal vertical sectional view through my pad forming machine. Fig. 2 is a plan view. Fig. 3 is a transverse, vertical sectional view on line 3—3 of Fig. 1. Fig. 4 is a perspective view of the feed mechanism. Fig. 5 is a pseudo diagrammatic section representing the manner in which the pads are cut from a strip of felt.

In the drawings A and B indicate in general the two vertical, parallel side members of the machine frame joined together by the tie-rods 10. The side frames each comprise vertical posts 11 and 12 joined by bars 13, 14, and 15. A work supporting table 16 is secured between the vertical side members A and B upon the upper cross bars 15, an extension 17 being provided to receive the material to be operated upon and an inclined chute 18, extending from the opposite end of the table receives the material after it has been acted upon, and the pads cut therefrom. A downwardly extending head 19 is formed near the center of the table and is provided with an opening 20 through which is guidedly reciprocated the node forming plunger 21. As a further guide for the plunger 21 two transverse pieces 22—22 extend between the side members A and B and are secured to the central cross bars 14.

Above the work receiving table and vertically spaced therefrom to provide a passage for the goods is a cross piece 23 mounted upon the upper edges of the two side walls 24 and 25. This cross piece 23 carries a forwardly extending pair of lugs 26 between which is pivotally mounted a drag foot 27 the lower end of which carries a roller 28 pressed by the spring 29 downward into the path of the goods thereby sufficiently tensioning the same for proper operation. A plate like forward extension 30 of the cross bar 23 is provided with two transverse slots 31—31 in which are slidably adjusted the two edge guides 32—32.

The rear face of the cross bar 23 is slotted at 33 to receive the forward edge of the female die 34 which is secured at its opposite ends by means of screws 35 or other fastening means, to the vertical spacing walls. The female die 34 is provided with an opening 36 beveled off at its under edges and of a shape—regular or irregular in outline—adapted to form the particular size pad to be made by its coöperation with the male die 37 carried on the upper end of the plunger 21. Both dies are made readily interchangeable so that the machine may be quickly and easily adapted for manufacturing pads of different sizes and shapes. The male die 37, it will be understood is of similar shape, in plan, to the aperture of the female die, and in elevation said male die or former is shaped convexly, in substantial accordance with the desired elevation of the pad to be cut.

The vertical reciprocation of the plunger 21 is limited by means of the adjustable stop 38 carried by the projecting lug 39, and on the opposite side of the plunger a similar projecting lug 40 carries a spring pressed clamp plunger 41 which on the upward movement of the plunger 21 pressed against the goods at the feed side of the die, securely holding its against the action of the cutting knife. The scalping or cutting knife in this embodiment of my invention comprises a sharpened disk 42 carried upon the lower end of the vertically arranged shaft 43 driven by the motor 44 the entire mechanism being carried upon the slidable bridge or carriage 45, the lower or downward extending legs 46 of which engage in the slotted guide ways 47. This permits an easy sliding motion of the knife forward across the top of the female die 34, to scalp a presented node; and rearwardly out of the way, when the goods are fed for the next operation. The rotary knife will cut the fibrous material clearly, making its cut, of course in a horizontal plane, and I find in practice that any cutter employed should be given a "sawing" or "saw-cutting" action, rather than a "chopping" action or a "planing" action as the felt is highly resistant to severance by a "chopping" or "planing" cut.

The feeding mechanism comprises two flat feed jaws 48 and 49, the upper one of which has laterally projecting shoulders 50 which engage in the slots 51 providing a support and a guide therefor. The lower jaw 49 slides within a depression 52 in the work table 16. The two jaws are joined together by means of tongs 53 the rear ends of which are joined to the transverse operating rod 54, so arranged that when the rod 54 moves forward in a direction opposite to the feed, the jaws separate, release the material, and advance for a fresh grip thereon. The upper jaw of course remains in the same horizontal plane because of its guiding connection with the frame, whereas the lower jaw is free to drop away from the goods and release the same. On the rearward movement of the tongs the jaws are drawn together, securely gripping the material and advancing it a predetermined distance for presentation of a fresh part of the strip to the node forming apparatus. The feed structure may, of course, be varied in specific embodiment, but that which I have described is positive in action and simple in construction.

The proper sequential operation of the node forming mechanism, the scalping tool and the feed mechanism may of course be obtained in a variety of ways, but as a simple and efficient method of carrying out my invention I have illustrated a pair of levers operated upon by a single continuously rotating cam, 55. This cam is carried by a transverse shaft 56 journaled at 57—57 upon the lower bars 13 of the two side members A and B. An electric motor 58 carried by the machine frame supplies power to the shaft through the reduction gearing 58'.

A forwardly extending lever 59 is secured at its rear end upon a transverse rod 60, journaled at its ends upon the side frames A and B adjacent the intersection of the lower cross bars 13 and the vertical posts 12. At the forward end of the lever 59 it is pivotally connected with the plunger 21 through the medium of a yielding pitman 61 whereby the plunger is given a yieldingly vertical movement as the roller 62 carried by the arm 59 rides upward upon the high part of the cam 55.

A transverse shaft 63 is journaled near its ends in the brackets 64—64 which depend from the cross bars 14—14 and carries near its center a downwardly extending arm 65 which carries a roller 66 positioned to engage the cam 55 at approximately 90 degrees from the roller 62. Two upwardly extending rods or arms 67 are secured at their lower ends to the ends of the shaft 63 and are connected at their upper ends through the medium of the links 68 to the sliding knife carrying bridge 45. Coil springs 67' secured at one end to the arms 67 and at the other end to a stationary part of the frame, normally hold the upper ends of the arms rearwardly when not influenced by the cam. A short distance below the upper ends of the arms 67 a transverse rod 69 joins the two arms 67 together and extends through a slot 70 in a rod 70' which is pivoted on the feed tong operating rod 54. The length of the slot 70 is adjustable as to the relative position of its rear face by means of the set screw 71 so that whereas the engagement of the rod 69 with the forward face of the slot 70 always insures the jaws moving forward to a predetermined point, their rearward or feeding movement may be adjusted by means of the screw 71 for any desired distance, depending on the size of pad cut from the strip.

I have shown in this machine a cam having an elevated portion extending through approximately 90 degrees, the surface being curved inwardly from the ends of the raised portion to provide easy and free movement of the cam engaging rollers from the lower points to the raised points. It is obvious from the above description that as the cam rotates in the direction indicated by the arrow in Fig. 1 the arm 59 will first be raised throwing upward the plunger 21 and through the medium of the male die 27 force a node of the goods through the female die 34. While the roller 62 is still riding up the elevated portion of the cam, the roller 66 is gradually raised throwing forward the cutting knife 42 and severing the node from the goods. At the same time the feed tongs are released and moved forward to take a fresh grip on the material. The further rotation of the cam causes the descent of the roller 62, lowering the node forming plunger 21 and subsequently permitting the rearward movement under the influence of springs 67' of the cutting knife 42 and feed tongs which are now engaged with the material. This causes the proper feeding through the machine of the felt strip and prepares it for the next raise of the plunger 21 and subsequent cutting out of another pad.

In Fig. 5 I have illustrated pseudo-diagrammatically the operation of the instrumentalities upon a strip of felt. A portion of the stock, as the felt strip 80 illustrated, of suitable thickness, is fed over the goods supporting table 16 and on the upward movement of the plunger 21 pushes through the female die 34 a tensioned node or bend 81 projecting above the upper surface of the die 34. Such node will have the plan contour defined by the female die, and a convex elevation corresponding nearly with the elevation of the male die. The node of material will be clamped between the male and female dies and its fibers will be put under considerable tension. Thus the felt is presented in a fashion that best prepares it for cutting. Stretched taut over the male die, clamped throughout all (or in any event a very considerable portion of) its perimeter by the female-die-edge, and held still with reference to these co-acting work-presenting members, the felt cannot slip, or yield, or "buckle," or bunch up, when the cutting is effected, and the edges of the female die give such clear, sharp definition of the pad-shape that the cutting operation may sever a perfectly formed, accurately-edged pad. While the node is thus held or fixed in its tense condition, the cut is made, by a relative movement of the cutting instrumentality and the work-holding instrumentalities, there being, preferably, no change in the relation of the parts of the work holding means until the cut is completed. The scalping knife 42 then moves across the upper surface of the female die severing the pad 83 from the body of the goods with its effective "sawing" action. This gives to the severed body by reason of its resiliency and the tension under which the fibers are placed during the formation of the node a plano-convex shape as indicated by the severed piece 84, resembling in general conformation the shape of the upper end of die 37 carried by the plunger 21. The severed body of material tends by reason of its resiliency to return to its initial condition as to tension and therefore reverses, when severance is completed. That is the severed articles take the shape the reverse of that which was imposed on the stock by the bending operation that presented the node to the action of the cutter, the curved node surface springing back to its original shape, planar or otherwise, and the cut surface assuming a convex form.

As far as I am aware my machine is the first ever produced to successfully skive felt in the manner described for the formation of convex pads, and it will be understood that except as expressed in the claims I do not limit my invention to the precise embodiment that I have herein illustrated for purposes of full disclosure.

I claim:—

1. In a mechanism of the character described for making convexed or concaved bodies of felt or similar elastic material, the combination of means for bending a piece of material into a node, and saw-cutting means for scalping the node.

2. In a mechanism of the character described, the combination of means for presenting a tensioned node of elastic fibrous material and saw-cutting means for scalping said node while under tension, to permit reversal of the severed pad.

3. In a mechanism for making convexed or concaved bodies of elastic material, the combination of a die having an aperture therein, means for protruding a piece of material through the die, to form a node, and means for scalping the node.

4. In a mechanism for making convexed or concaved bodies of elastic material, the combination of a die having an aperture therein, a male die adapted to coöperate with the opening in the first die, means for moving one of said dies to project a piece of material through the aperture to form a node, and means for scalping the node.

5. In a mechanism for making convexed or concaved bodies of felt or the like, the combination of a die having an aperture therein conforming in plan to the outlines of the article to be formed, a male die having a surface configuration approximating that of the body to be formed, means for relatively moving the two dies to project a portion of material through the said aperture, and means for scalping the material projecting through the opening.

6. In a mechanism for making convexed or concaved bodies of felt or the like, the combination of a planar die having an opening therein, a male die adapted to coöperate with the planar die and project a node of goods therethrough, and means for scalping the said node substantially at the surface of the planar die.

7. In a mechanism for making convexed or concaved bodies of elastic material, the combination of coöperating dies for forming a tensioned node in the material, and saw-cutting means for scalping the node while under tension.

8. In a mechanism for making convexed or concaved bodies of felt or the like, the combination of means for forming a node in the goods, saw-cutting means for scalping the node while under tension, and means for feeding the material to present a fresh piece of material to the node former.

9. In a mechanism of the character described, the combination of a node forming mechanism, a saw-cutting scalping mechanism, feed mechanism, and automatic means for actuating the said mechanisms in proper sequential order.

10. In a mechanism for making convexed or concaved bodies of elastic material, the combination of coöperating dies for forming a tensioned node in the material, saw-cutting means for scalping the node while under tension, and means for operating said node forming means and scalping means in proper sequential order.

11. In a machine of the character described, a planar apertured die, a table therebelow, a male die working upward past the table to present a tensioned materials-node through the die-aperture, a cutter working above and parallel with the planar die, a fabric feed mechanism, and operating means for sequentially raising the male die, moving the cutter, lowering the male die and working the feed.

12. In a machine of the character described, a planar apertured die, a table therebelow, a male die working upward past the table to present a tensioned materials-node through the die-aperture, a cutter working above and parallel with the planar die, a fabric feed mechanism, and automatic operating means for sequentially raising the male die, moving the cutter, lowering the male die and working the feed.

13. In a machine of the character described, the combination of a sawing-cutter, means to one side of the cutting plane of said cutter for presenting a tensed, clamped portion of flexible fibrous material, as felt or the like, past the cutter plane, and means for operating the cutter to sever the said portion.

14. In a machine of the character described, the combination of a sawing cutter, means to one side of the cutting plane for protruding a fixed, clamped node of flexible fibrous material, as felt or the like, past the cutter-plane, and means to relatively move said parts that the cutter may scalp the node.

In testimony whereof I hereunto set my hand in the presence of two subscribing witnesses.

DAVID W. ANDERSON.

In the presence of—
  Vincent P. Dooley,
  B. W. Phillips.

Copies of this patent may be obtained for five cents each, by addressing the "Commissioner of Patents, Washington, D. C."